A. WILLIAMS.
VEHICLE WHEEL.
APPLICATION FILED AUG. 22, 1910.
1,000,472.  Patented Aug. 15, 1911.
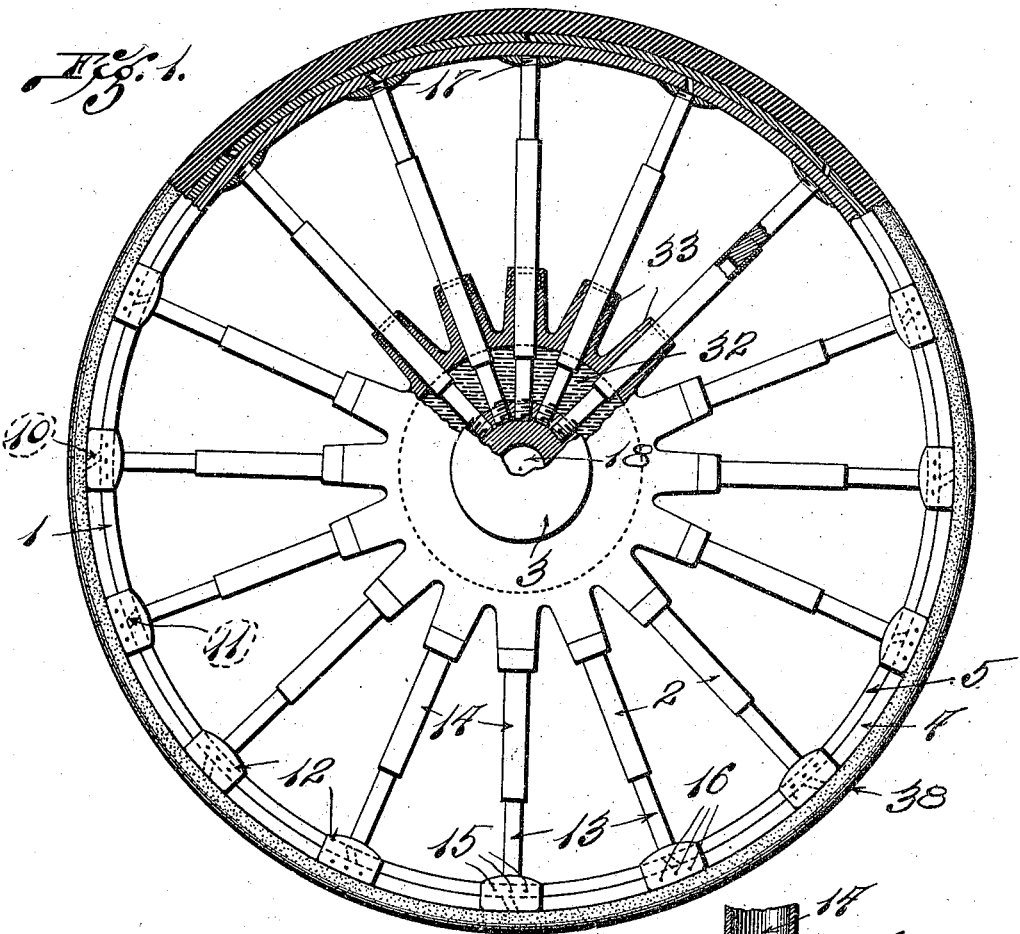
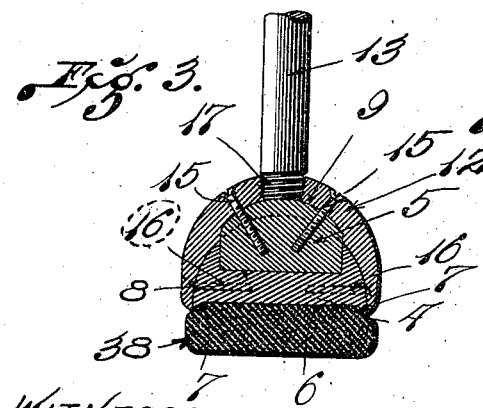
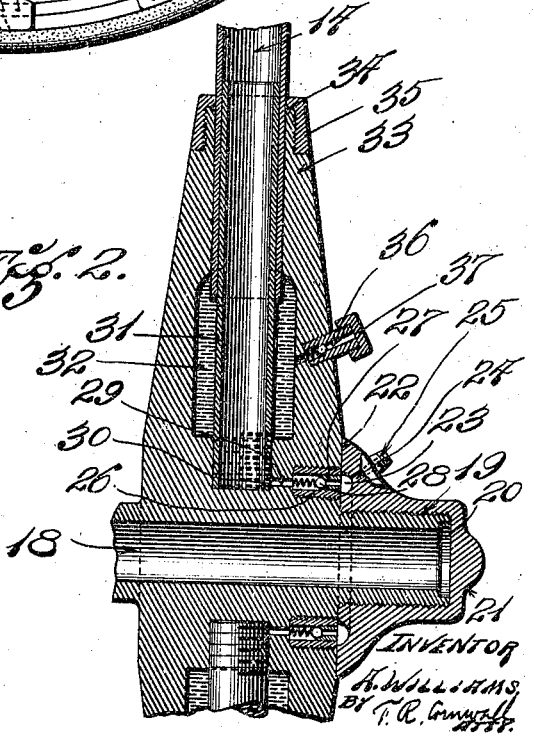

UNITED STATES PATENT OFFICE.

ALBERT WILLIAMS, OF ST. LOUIS, MISSOURI.

VEHICLE-WHEEL.

1,000,472.

Specification of Letters Patent.   Patented Aug. 15, 1911.

Application filed August 22, 1910.  Serial No. 578,384.

*To all whom it may concern:*

Be it known that I, ALBERT WILLIAMS, a citizen of the United States, residing at St. Louis, Missouri, have invented a certain new and useful Improvement in Vehicle-Wheels, of which the following is a full, clear, and exact description, such as will enable others skilled in the art to which it appertains to make and use the same, reference being had to the accompanying drawings, forming part of this specification, in which—

Figure 1 is an elevational view of my improved device partly broken away in order to show certain detail construction. Fig. 2 is a sectional detail view of the hub of the wheel. Fig. 3 is a sectional detail of the rim and tire of the wheel.

My invention relates to an improvement in wheels to be used on any type of vehicles, and especially in automobile construction.

One of the objects of my invention is to provide a vehicle wheel which has all the advantages of the pneumatic feature of wheels now in common use and avoids their defects.

It is a well known fact that the ordinary pneumatic tire is very expensive as to first cost, and also as to repair. It is also well known that the ordinary solid tire construction on vehicle wheels is not satisfactory as there is not enough resiliency in the tire to offset the vibration produced because of the irregularity of the surfaces upon which the wheels are moved, and therefore, these wheels do not absorb or regulate the vibration to produce easy motion of the vehicle.

It is my idea to take advantage of the resiliency of compressed air in the wheel construction and yet make use of the solid rubber tire.

Referring to the drawings, 1 indicates generally the rim of the wheel, 2 the spokes and 3 the hub.

The rim 1 is comprised of two overlapping sets of sectional parts, 4 and 5 respectively. The parts 4 as indicated in Fig. 3 are shaped with a flat periphery 6 having slightly angular corners 7 at each edge. Opposite the periphery the portion 4 is grooved as at 8 for the reception of the sections 5. The sections 5 are suitably shaped to fit in the groove 8, and are curved on their outer periphery as at 9. These sections 4 and 5 as indicated on Fig. 1 are separated to form inclined slots 10 and 11 in order to allow the adjacent sections 4 and 5 to approach and recede from each other.

The spokes 2 are comprised of a head portion 12 and telescopic intermediate portions 13 and 14. The head portion 12 is shaped on its interior to fit snugly over the interengaging sections 4 and 5, and the spokes are arranged so that these head portions overlap the sections 4 and 5 wherever there is a slot 10 or 11 between adjacent sections of the rim. It should be noted that one head 12 overlaps a slot 10 in the outer section 4 and the next head 12 overlaps a slot 11 in the inner sections 5. In this manner the sections 4 and 5 break joints. The heads 12 are attached to the sections 4 and 5 which are not broken away to form the slots 10 or 11, by means of screws 15 and 16. The intermediate portion of the spoke 2 which is designated 13 is solid and is screw threaded at 17 into each head 12. The portion 13 is connected to the portion 14 which is also telescopically mounted in the hub 3.

As seen from Fig. 2 the hub 3 is formed with a bearing for the axle at 18, and is formed with a screw threaded end portion 19 having a countersunk portion 20 at the end. Screwed onto the portion 19 is a cap 21 with a flat face 22 having a groove 23 cut therein, and an opening 24 bored through from the outside of the cap to the groove. Mounted on this opening 24 is the ordinary screw cap 25.

On the face of the hub 3 which engages the face 22 of the cap is fitted a series of bushings 26 screw threaded into the hub opposite each spoke 2. These bushings 26 are made hollow and have secondary bushings 27 screwed therein with a ball valve 28 adapted to be seated against the curved face of the bushing 27. If desired a small spring may be introduced into the bushing 26 to keep the ball 28 seated against the end of the bushing 27.

29 is a slot extending from the bushing 26 through the hub to an opening formed in the spoke 2. This opening 30 is bored in a sleeve 31 which is screw threaded into the hub and extends upward from the passageway 29 through the hub 3 and inside the telescopic section 14 of the spokes 2.

The section 14 slides over the hollow sleeve 31 and through the hub into a recess 32 formed around the hub. The hub 3 on its outer periphery is formed in a series of projections 33 through which the telescopic member 14 passes. In order to form a tight joint at this point a packing ring 34 is introduced at the end of the projection 33 and the projections are suitably formed with an external threaded portion in order that a cap 35 may be screwed thereon to hold the packing ring 34 in place.

Extending into the recess 32 is an opening 36 having a screwed cap 37 fitted thereover. This recess 32, by means of the opening 36, is kept filled with oil or water or other suitable liquid in order to keep the joints between the sliding section 13 and the sleeve 31 air tight. The liquid filled recess also acts to form a cushion in the spoke section 14, so that when a spoke is pressed in at one side of the wheel this pressure will be transmitted through the fluid to a spoke on the opposite side of the wheel to push this spoke out and thereby cushion the shock on the wheel produced by striking an obstruction.

Mounted on the outside periphery of the outer section 4 of the wheel is a solid rubber tire 38 of ordinary flat construction.

To keep my wheel in expanded position it is only necessary to unscrew the plug 25 and pump air through the opening 24 into the grooves 23 and from there past the ball valves 28 through the openings 29 and 30, and into the interior of the sleeves 31 and telescopic portion 14 to press finally against the solid portion 13 of the spoke.

As the rim 1 is made up of sections which are capable of expansion to increase the periphery of the wheel, and as the tire 38 is capable of being expanded to increase its periphery, it is clear that my improved wheel is held in the expanded position by means of the compressed air introduced into the hub and spokes, and therefore, any shock or vibration due to unevenness in the roadway may be taken up not by the tire, but through the resiliency of the spokes.

I am aware that minor changes may be made in the construction and arrangement of the parts of my device without departing from the spirit of my invention, the scope of which is indicated by the accompanying claims.

I claim:

1. In a vehicle wheel, in combination, a hub, telescopic spokes extending around the periphery thereof, and a rim comprising independent inner and outer sets of sections, the inner sections being attached to alternate spokes, and the outer sections to alternate spokes.

2. In a vehicle wheel, in combination, a hub, telescopic spokes extending therefrom, a rim comprising an inner and outer set of independent sections, said inner set being arranged to form a lap joint with the outer set, the adjacent sections in each set being attached to alternate spokes.

3. In a vehicle wheel, a hollow hub filled with liquid, a series of spoke sections extending through the liquid and screw seated in the central portion of the hub, telescoping sections mounted on said spoke sections, and extending through the outer portion of the hub, outer spoke sections seated in the outer ends of the telescoping sections, a rim on the outer ends of the outer spoke sections, and a tire on said rim.

4. In a vehicle wheel, a hub, hollow spokes attached to the hub, means whereby compressed air may be introduced into the hollow spokes, comprising a groove connected with each spoke, a ball valve within the groove, and a cap applied to the hub having a continuous groove connecting with each groove communicating with the spokes, and a connection from the outside of the cap to the continuous groove therein.

5. In a vehicle wheel having a hub, hollow sectional spokes, and a sectional rim, means for introducing compressed air within the hollow spokes, a chamber within the hub filled with liquid which entirely surrounds the joint between a pair of the hollow sectional members of each spoke.

6. In a vehicle wheel having a recessed hub, telescoping hollow spokes, having one section attached to the hub, means whereby compressed air may be introduced into the hollow spokes, and liquid within the recess in the hub forming a cushion for a section of the spoke telescoping the section attached to the hub.

7. In a vehicle wheel, a recessed hub, spokes comprising telescopic sections, one section being attached to the hub, and the other telescoping the first section extending within the recess in the hub, means for introducing compressed air within the fixed section of the spoke, and means for introducing liquid within the recess in the hub.

In testimony whereof I hereunto affix my signature in the presence of two witnesses, this 20 day of August, 1910.

ALBERT WILLIAMS.

Witnesses:
J. P. CROSBY,
E. W. BANISTER.